US 6,657,330 B2

(12) United States Patent  (10) Patent No.: US 6,657,330 B2
Baer et al.                 (45) Date of Patent:     Dec. 2, 2003

(54) TURBO GENERATOR WITH A ROTOR WITH DIRECT GAS COOLING

(75) Inventors: Jürgen Baer, Mägenwil (CH); Josef Tommer, Würenlos (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/874,113

(22) Filed: Jun. 6, 2001

(65) Prior Publication Data

US 2003/0094866 A1 May 22, 2003

(30) Foreign Application Priority Data

Jun. 7, 2000 (DE) .......................... 100 27 798

(51) Int. Cl.[7] .................. H02K 1/22; H02K 9/00
(52) U.S. Cl. .................. 310/52; 310/58; 310/260; 310/270; 310/262
(58) Field of Search .................. 310/52, 58, 260, 310/270

(56) References Cited

U.S. PATENT DOCUMENTS

| | | | | |
|---|---|---|---|---|
| 2,712,085 A | * | 6/1955 | Willyoung | 310/262 |
| 2,833,944 A | * | 5/1958 | Willyoung | 310/61 |
| 4,379,975 A | * | 4/1983 | Kitajima | 310/59 |
| 4,395,816 A | | 8/1983 | Pangburn | |
| 4,922,147 A | | 5/1990 | Sismour, Jr. et al. | |
| 5,483,112 A | | 1/1996 | Biseli et al. | |
| 6,097,116 A | * | 8/2000 | Hess et al. | 310/58 |
| 6,252,318 B1 | * | 6/2001 | Kazmierczak | 310/260 |
| 6,417,586 B1 | * | 7/2002 | Jarczynski et al. | 310/61 |

FOREIGN PATENT DOCUMENTS

| | | | |
|---|---|---|---|
| DE | 34 08 986 A1 | 9/1985 | |
| DE | 88 11 379 | 12/1988 | |
| DE | 3807277 A1 | * 9/1989 | .......... F04D/29/38 |
| DE | 694 08 797 T2 | 10/1998 | |
| DE | 199 05 540 A1 | 8/2000 | |
| EP | 0 849 859 A1 | 6/1998 | |
| EP | 0 854 559 | 7/1998 | |
| EP | 1 091 468 A1 | 4/2001 | |

OTHER PUBLICATIONS

Salamah et al., Jun. 27, 2002, U.S. patent application Publication US 2002.0079784 A1.*

* cited by examiner

Primary Examiner—Nestor Ramirez
Assistant Examiner—J. Aguirrechea
(74) Attorney, Agent, or Firm—Burns, Doane, Swecker & Mathis, L.L.P.

(57) ABSTRACT

In a turbo generator with a rotor with direct gas cooling, which rotor is provided with a rotor winding arranged around a central rotor body, said rotor winding being on the front sides covered by one each annular cap plate, and in which rotor cold cooling gas for cooling the rotor flows into ring gap segments between the cap plate and the rotor body, whereby the ring gap segments are bordered, when seen in circumferential direction, on the sides in each case by the section of an end spacer plate provided between the cap plate and the rotor winding, whereby this section is projecting into the ring gap, improved cooling is achieved in that separations of the cooling gas stream on flowing into the ring gap segments are avoided by designing the sections of the end spacer plates, whereby these sections adjoin the ring gap, in a manner that is advantageous with respect to the flow.

13 Claims, 6 Drawing Sheets

TURBO GENERATOR WITH A ROTOR WITH DIRECT GAS COOLING

This application claims priority under 35 U.S.C. §§ 119 and/or 365 to Appln. No. 100 27 798.5 filed in Germany on Jun. 7, 2000; the entire contents of which is hereby incorporated by reference.

FIELD OF THE INVENTION

The present invention relates to the field of turbo generators for generating electrical energy, and more particularly to cooling turbo generators.

BACKGROUND OF THE INVENTION

In order to cool a rotor or remove its electrical heat losses in a generator, a (mostly gaseous) cooling medium flows through the rotor (see, for example, EP-A1-0 854 559). An important factor for good cooling is hereby the inflow geometry at the front faces of the rotor. A known inflow geometry is shown in FIGS. 1A and 1B, whereby FIG. 1B shows an unwound view of the rotor front face, and FIG. 1A the section through the (not unwound) rotor front face in the plane A—A of FIG. 1B. The rotor 10 of a generator (13) comprises a central, cylindrical rotor body 18, around which one or more rotor winding(s) 14 is/are provided on the outside. The rotor winding 14 passes through the rotor active part 11 in several conductor bundles parallel to the rotor axis and makes a turn-around of 180° in the rotor winding head 12 between two conductor bundles. The widening space is closed off on the front face by an annular cap plate 19 (22 in FIG. 2 of EP-A1-0 854 559). End spacer plates 16 with the shape of a ring segment are provided between the cap plate 19 and the rotor winding 14. Cold cooling gas for cooling the rotor 10 flows into ring gap segments 33. 34 between the cap plate 19 and the rotor body 18. The ring gap segments 33, 34 are bordered when seen in circumferential direction, on sides in each case by the section 16' of the end spacer plate 16 provided between the cap plate 19 and the rotor winding 14, whereby this section 16' is projecting into the ring gap. The section of the end spacer plates 16, whereby said section is projecting into the ring gap between the rotor winding 14 and rotor body 18, forms a continuous dividing wall together with two each axial chamber walls 15, 15', separating a cold gas chamber 25 and a warm gas chamber 32 with a gas inlet 21 and a gas outlet 22 (via corresponding ventilation grooves 20) from each other. The end spacer plate 16 is hereby used as a holder for the chamber walls 15, 15'. In most cases, this results in an overhang 24 that reaches into the cold gas chamber 25. In unfavorable cases, this overhang 24 even has an extension 23.

The sharp-edged termination of the overhang 24 or its extension 23 towards the adjoining cold gas chamber 25 is responsible for a strong contraction associated with separations of the stream. These stream separations (eddies 27) result in an uneven coolant supply to the rotor winding(s) (14) at the circumferential speed of the rotor 10. The resulting speed w of the coolant stream relative to the rotor 10 is hereby created according to the velocity triangle 26 in FIG. 1C by the vectorial overlapping of the axial flow speed c and the circumferential speed u of the rotor 10.

In order to avoid such separations, the initially mentioned EP-A 1-0 854 559 already suggested to provide a gas guide ring (GGR) in the form of a two-stage flow grate in the inlet area of the cold gas between the cap plate 19 and the rotor body 18. The GGR principally solves the ventilation technology problem, but has several disadvantages: on the one hand, the additional installation of such a GGR is associated with significant expenditure. On the other hand, its function is threatened as soon as significant changes are made in the cooling gas stream (e.g., for a shorter generator or lower performance). Finally, the function of the GGR depends on the rotation direction, so that the desired effect does not exist when the rotation direction is reversed.

SUMMARY OF THE INVENTION

It is therefore the objective of the invention to design the rotor cooling of a generator of the initially mentioned type in such a way that the supply of the rotor with cooling gas is improved without major additional expenditure, and that, in particular, when the cooling gas enters the rotor, undesired eddies or eddy separations are substantially avoided in the cooling gas stream, and that the flow resistance is reduced.

The core of the invention consists of avoiding separations of the cooling gas stream when the latter flows into the ring gap segments by providing a design with favorable flow characteristics for the sections of the end spacer plates, whereby said sections are projecting into the ring gap.

A first preferred embodiment of the invention is characterized in that, when seen in circumferential direction, the side edges of the sections of the end spacer plates, whereby said sections are projecting into the cooling gas stream, are provided with either a bevel or bezel, or a curvature adapted to the flow with one or more curvature radii. The bevels or curvatures essentially prevent separations of the inflowing cooling gas in the edge area, and the flow resistance is reduced, thus improving the rotor cooling decisively under otherwise identical underlying conditions. In addition, essentially insignificant eddies are dissolved by the acceleration of the coolant between the curvature and the segment cross-section. It is hereby especially advantageous that the end spacer plates with the beveled or curved sections close off a warm gas chamber bordered on the sides by two axial, parallel chamber walls at the front, and the beveled or curved sections end flush with the chamber walls.

A second preferred embodiment of the invention is characterized in that in the flow direction, upstream from the sections of the end spacer plates, one each additional gas guidance element is provided that deflects the cooling gas stream around the section. Independently from the curvature of the edges of the sections, the flow around these sections can be further homogenized and improved by the upstream gas guidance segments, whereby the separate gas guidance segments permit additional design and optimization possibilities.

The suppression of separating eddies is yet improved further, when the gas guidance segment, according to a preferred further development, is provided upstream from the section, separated from it by a gap, and is provided with a convex curved outside that faces towards the cooling gas stream, and that the section of the end spacer plate and of the upstream gas guidance segment are designed so that cooling gas is pressed from the inlet side into the gap against the rotation direction of the rotor. The cooling gas flowing through the gap additionally prevents the formation of eddies when it flows out. In order to prevent interfering influences on the gap flow, it is hereby advantageous if the gas guide segment is constructed at its edge that is in the rear in the rotation direction of the rotor in such a way that the cooling gas stream flowing through the gap is added to the cooling gas stream flowing into the adjoining ring gap segment essentially without a transition.

BRIEF DESCRIPTION OF THE DRAWINGS

The invention will be described in more detail below with reference to the drawings, wherein.

DETAILED DESCRIPTION OF THE INVENTION

In most cases of the described turbo generator rotor, no gas guide rings (GGR) are needed in order to achieve additional pressure for the rotor cooling. An improved material utilization as well as improved running properties (prevention of thermal unbalance) are achieved if the design is changed at the rotor inlet in order to avoid eddy formations (eddies 27 in FIG. 1B) at the coolant inlet as much as possible. The concept of the invention therefore consists of an improvement of the cooling gas supply (cooling stream distribution and volume through reduced stream rotor inlet resistance) of all turbo generators and, in the particular case, in the substitution of the GGR by avoiding the inlet stream separations.

Figure 1:
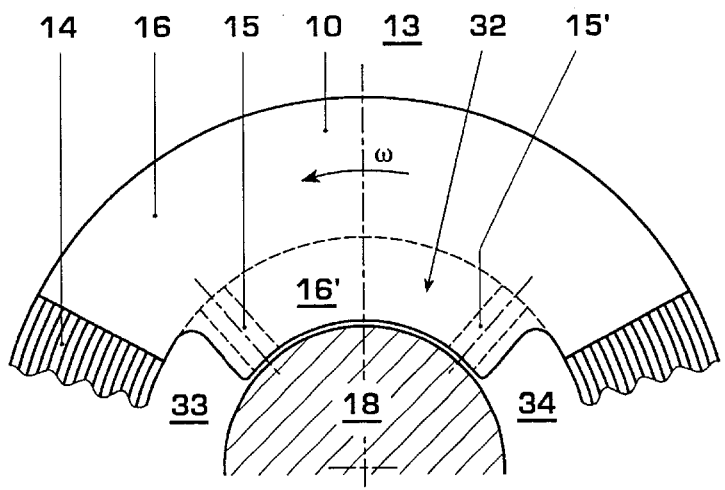
FIG. 1A is a cross-sectional view through the (not unwound) rotor front side in the plane A—A of FIG. 1B.
FIG. 1B is a top plan view of a rotor of the prior art.
FIG. 1C is a diagram of the velocity triangle for the cooling gas stream.
Figure 1:
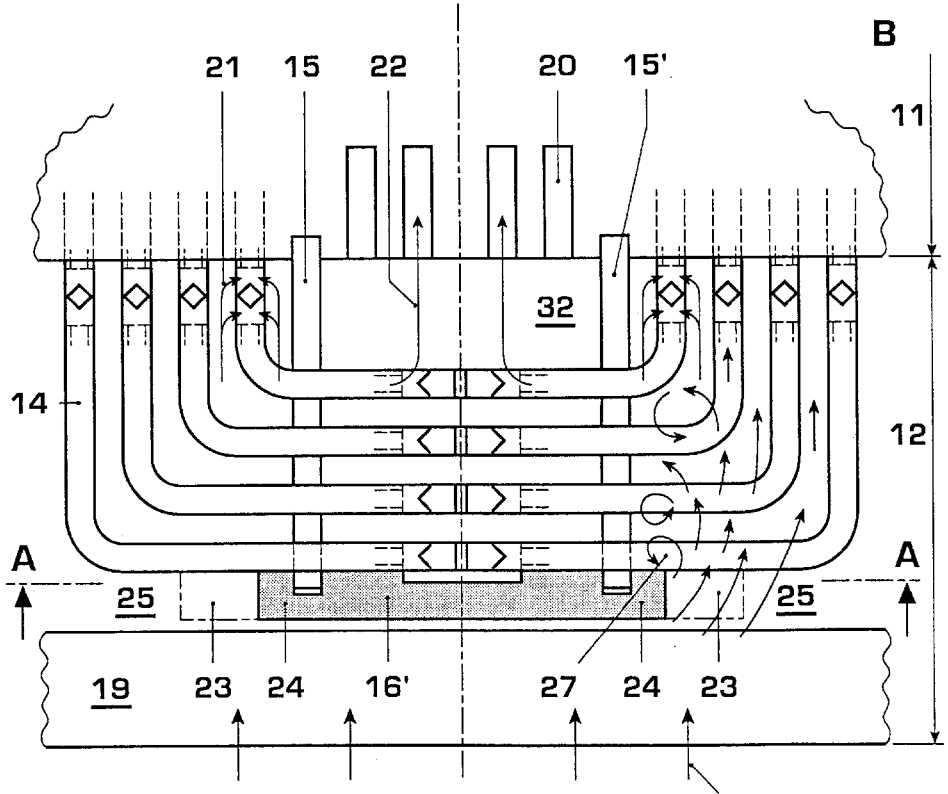
Figure 1:
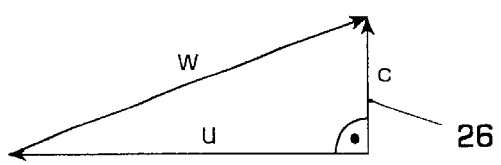
Figure 2:
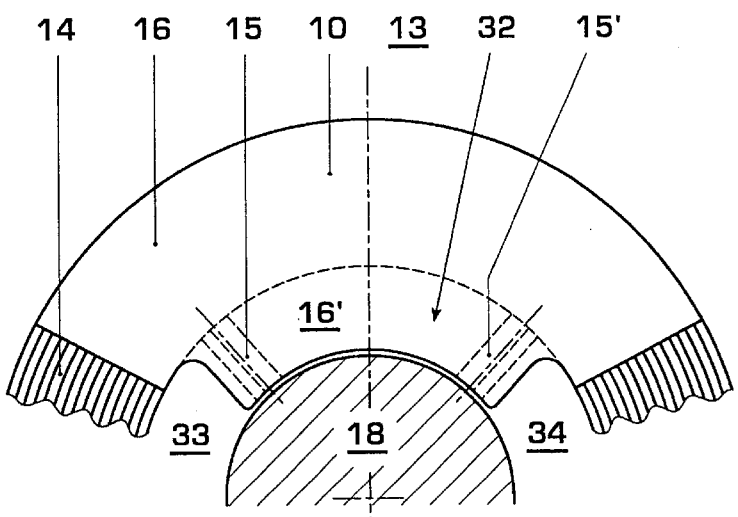
FIG. 2A is a cross-sectional view of the rotor along the line A—A in FIG. 1B, and showing a first preferred embodiment of the cooling gas stream guidance according to the invention.
FIG. 2B is a top plan view of a rotor in accordance with this invention, with an end spacer plate rounded at the edges.
Figure 2:
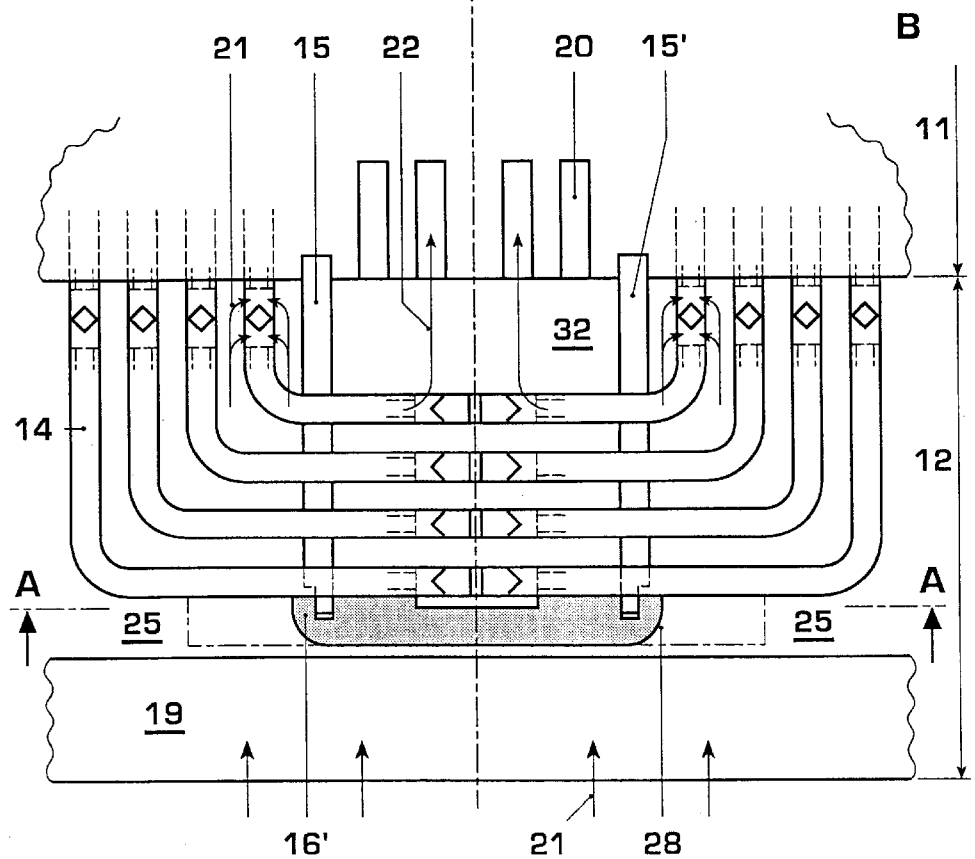

FIG. 2 shows a first preferred embodiment of the cooling gas stream guidance according to the invention in a view comparable to FIGS. 1A and 1B. The section 16' of the end spacer plate 16, whereby said section is projecting into the ring gap, in this case is provided not only with an overhang over the chamber walls 15, 15' that is shorter than in FIG. 1, (or even ends flush with the chamber walls 15, 15'), but primarily is provided with curvatures 28 (or bevels or bezels) at the lateral edges of section 16'. The shortening (or flush termination) and the curvatures 28, adapted in their curvature radius to the inflowing cooling gas stream, prevent the formation of eddies as much as possible, and the inflow resistance coefficient is clearly reduced.

Figure 3:
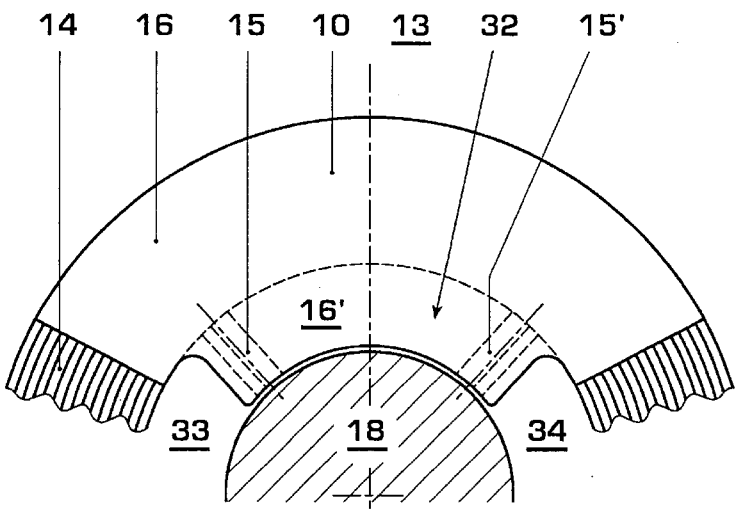
FIG. 3A is a cross-sectional view of the rotor along the line A—A in FIG. 3B and showing a second preferred embodiment of the cooling gas stream guidance according to the invention, with an end spacer plate rounded at the edges.
FIG. 3B is a top plan view of a rotor in accordance with the second embodiment of the cooling gas stream guidance.
Figure 3:
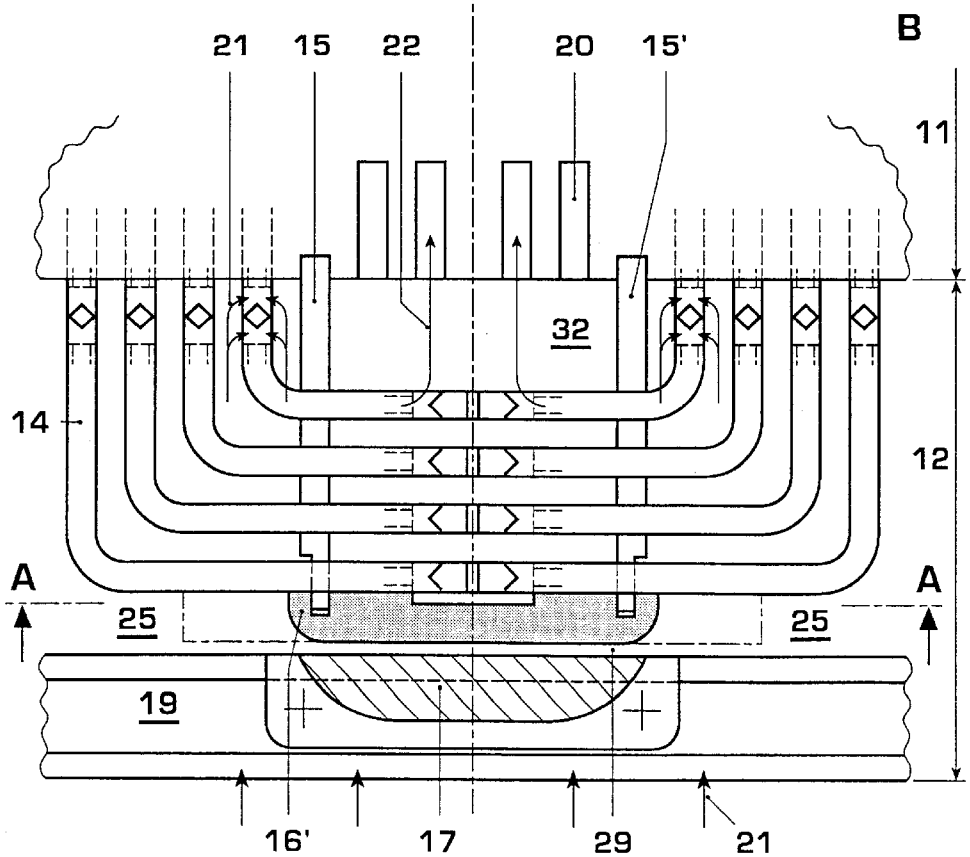

FIG. 3 shows a second embodiment of the invention. The section 16' of the end spacer plate 16, which has rounded edges, is here preceded by an additional gas guidance segment 17. The gas guidance segment 17 and end spacer plate 16 are separated from each other by a gap 29. The gas guidance segment 17, which here has a convex curved outside towards the cooling gas stream, guides the cooling gas stream around section 16' in a manner advantageous for the flow.

Figure 4:
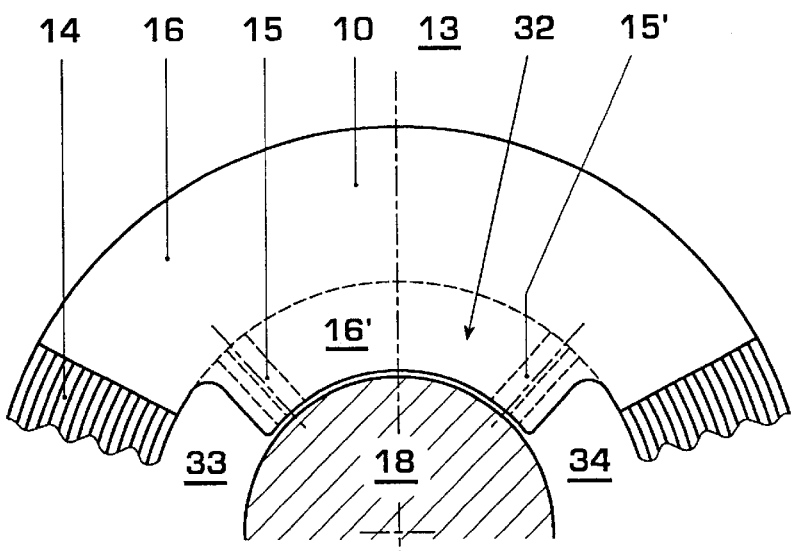
FIG. 4A is a cross-sectional view of the rotor along the line A—A in FIG. 4B and showing a third preferred embodiment of the cooling gas stream guidance according to the invention.
FIG. 4B is a top plan view of a rotor in accordance with the third preferred embodiment of the cooling gas stream guidance.
Figure 4:
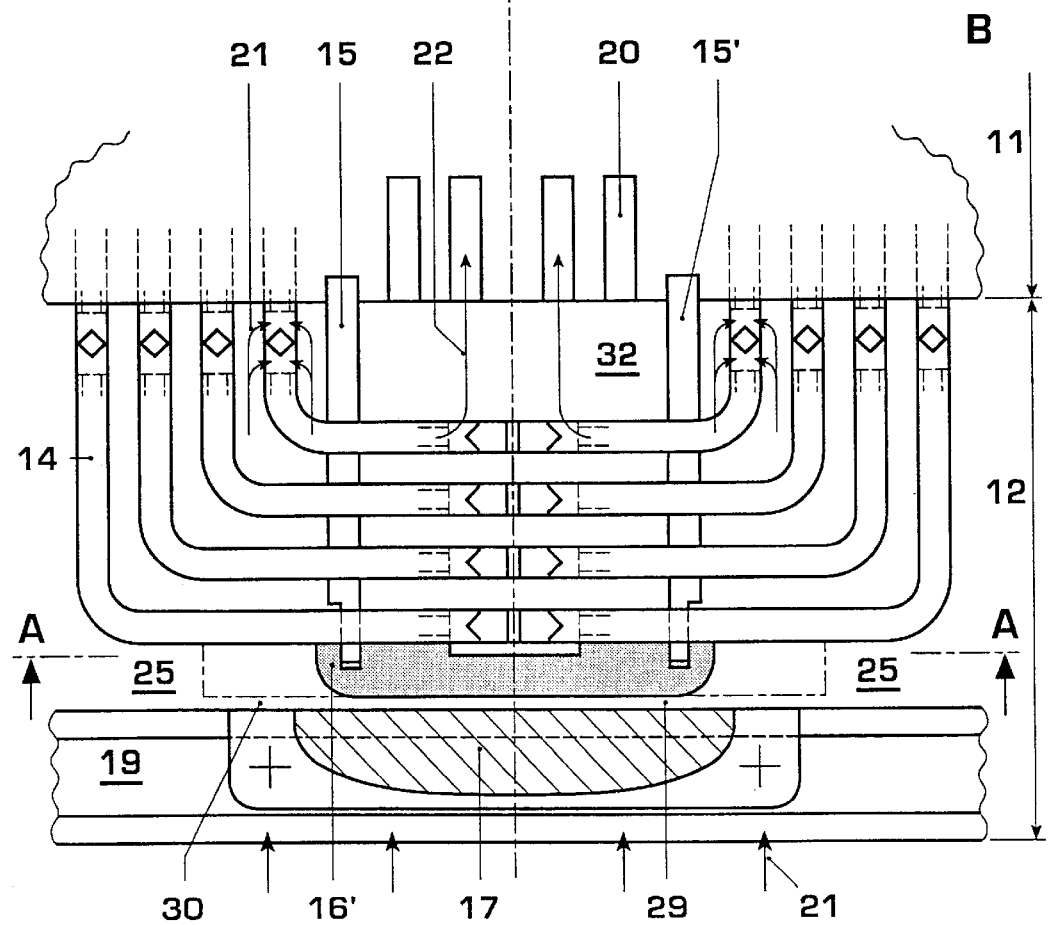

In a third embodiment in FIG. 4, the gas guidance segment 17 is lengthened in circumferential direction relative to section 16'. The gap 29 therefore can be used with respect to flow technology so that a small amount of coolant is pressed through the gap from the inlet side 30 as a result of the elevated dynamic pressure, in order to fill or dissolve any still existing eddies.

Figure 5:
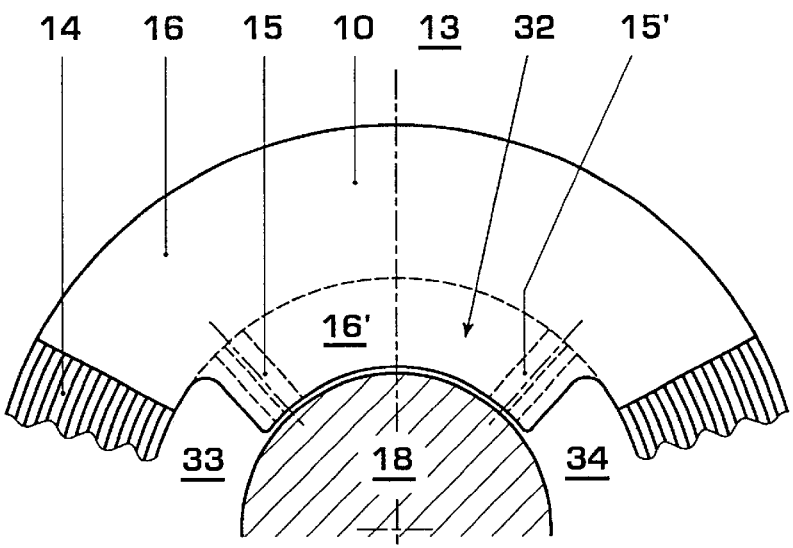
FIG. 5A is a cross-sectional view of the rotor along the line A—A in FIG. 5B and showing a fourth preferred embodiment of the cooling gas stream guidance according to the invention.
FIG. 5B is a top plan view of a rotor in accordance with the fourth preferred embodiment of the cooling gas stream guidance.
Figure 5:
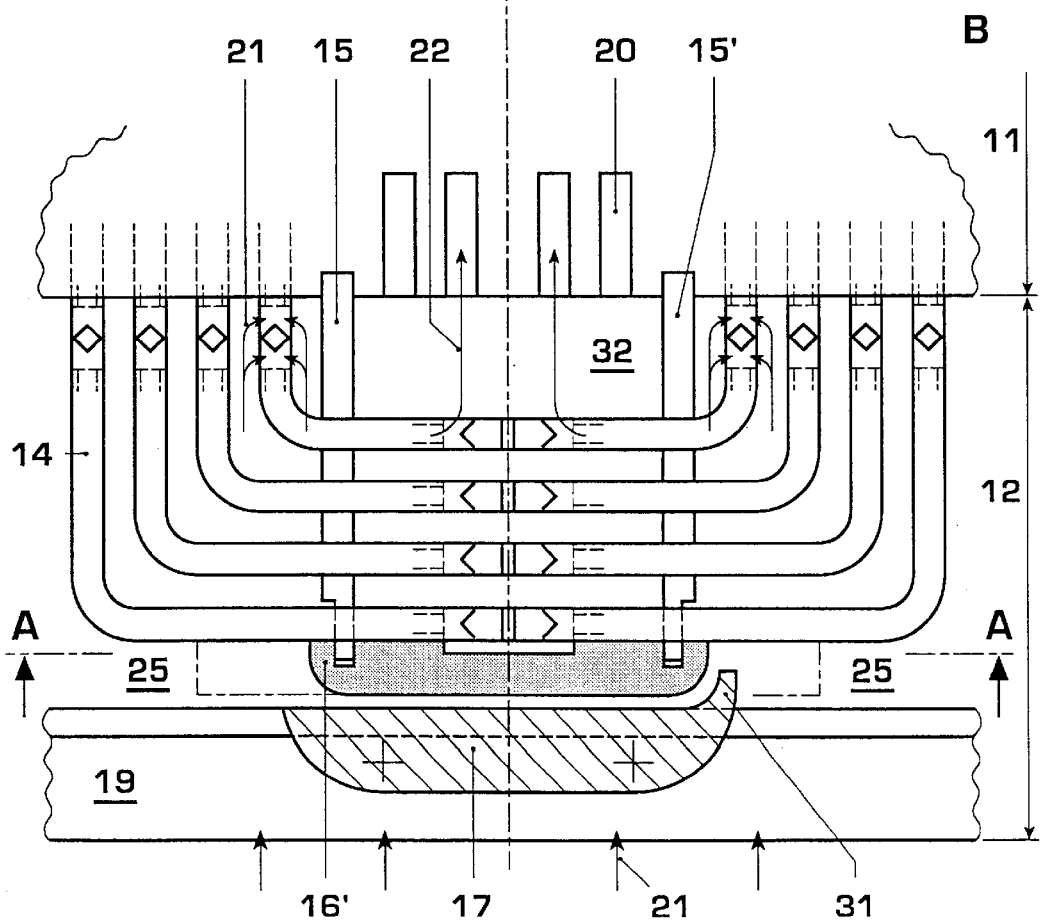

Another embodiment is shown in FIG. 5. Here the gas guidance segment 17 attached to the cap plate 19 has been improved even more with respect to flow technology by providing it with an inwardly curved nose 31 at the outlet side of the gap 29. In this way, the cooling gas flowing out of the gap 29 can be returned better (in terms of flow) into the cooling stream of the rotor 10.

Figure 6:
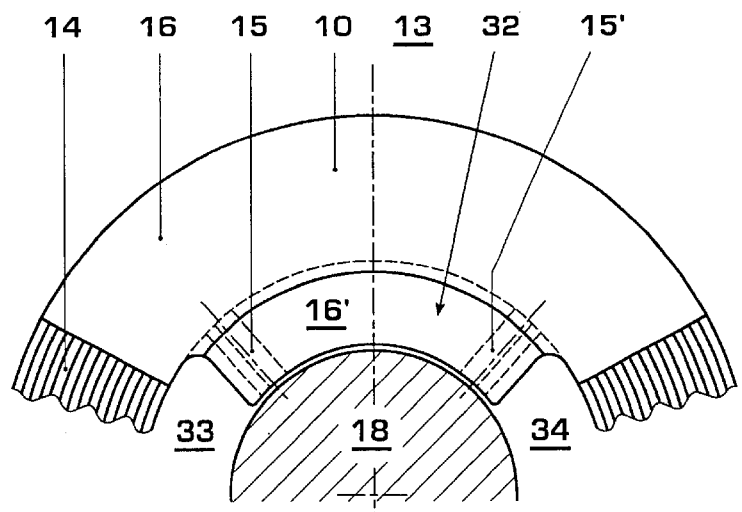
FIG. 6A is a cross-sectional view of the rotor along the line A—A in FIG. 6B and showing a fifth preferred embodiment of the cooling gas stream guidance according to the invention.
FIG. 6B is a top plan view of a rotor in accordance with the fifth preferred embodiment of the cooling gas stream guidance.
Figure 6:
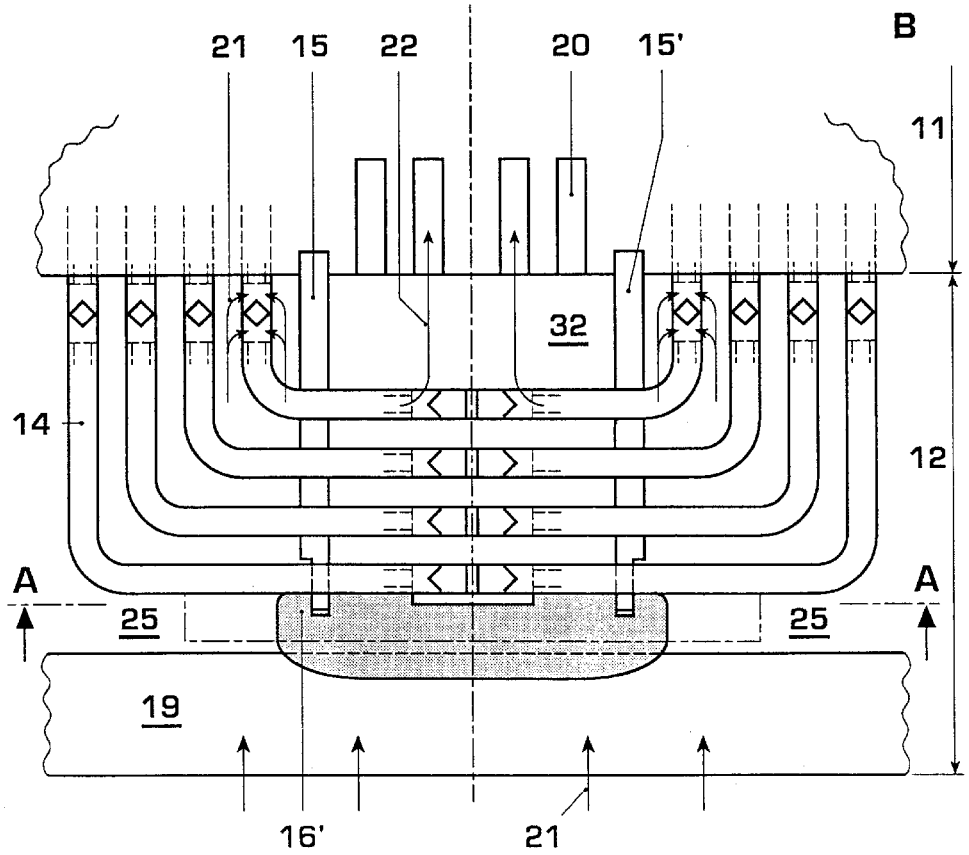

Another embodiment according to FIG. 6 eliminates the additional gas guidance segment 17. In this case, the section 16' of the end spacer plate 16, whereby said section is projecting into the ring gap, has a greater thickness than the remaining part of the end spacer plate 16 and projects with its side facing the cooling gas stream into the area below the cap plate 19. In this way, a greater curvature radius can be realized at the edges of the section 16', which benefits the flow in the inlet.

Overall, the invention provides a simple and material-saving improvement and homogenization of the rotor cooling, which-except for the embodiment shown in FIG. 5—can be used without changes for both rotation directions of the rotor 10.

What is claimed is:

1. A turbo generator comprising a rotor with direct gas cooling, said rotor including a rotor winding arranged around a central rotor body, said rotor winding being covered on front sides by an annular cap plate, and in which rotor cold cooling gas for cooling the rotor flows into ring gap segments of a ring gap between the rotor winding and the rotor body, wherein the ring gap segments are bordered in a circumferential direction, on sides of the ring gap segments in each case by a section of an end spacer plate provided between the annular cap plate and the rotor winding, wherein said sections of said end spacer plates project into the ring gap and are shaped to avoid separations of the cooling gas stream flowing into the ring gap past said sections.

2. The turbo generator as claimed in claim 1, wherein side edges of the sections of the end spacer plates as viewed in a circumferential direction and projecting into the cooling gas stream, are provided with either a bevel or bezel.

3. The turbo generator as claimed in claim 1, wherein side edges of the sections of the end spacer plates as viewed in a circumferential direction and projecting into the cooling gas stream, are provided with a curvature with one or more curvature radii adapted to the cooling gas stream.

4. The turbo generator as claimed in claim 2, wherein the end spacer plates with the beveled or rounded sections on the front side close off a warm gas chamber defined on the sides by two axial, parallel chamber walls, and the beveled or rounded sections terminate flush with the chamber walls.

5. The turbo generator as claimed in claim 2, wherein a gas guidance segment that guides the cooling gas stream around one of said sections of said end spacer plates is provided in the flow direction upstream from each of said sections of said end spacer plates.

6. The turbo generator as claimed in claim 5, wherein each of said gas guidance segments is separated in the upstream direction from one of said sections by a gap, and is provided with a convex curved outside facing the cooling gas stream.

7. The turbo generator as claimed in claim 6, wherein each of said gas guidance segments has essentially the same length in a circumferential direction as said one of said sections of the end spacer plates and cooperates with the section in affecting the flow of the cooling gas stream.

8. The turbo generator as claimed in claim 6, wherein the section of the end spacer plate and the upstream gas guidance segment are shaped so that cooling gas is pressed from the inlet side into the gap against the rotation direction of the rotor.

9. The turbo generator as claimed in claim 8, wherein the gas guidance segment in the rotation direction of the rotor projects with at least its front edge beyond the section of the end spacer plate.

10. The turbo generator as claimed in claim 8, wherein the gas guidance segment is shaped at its rear edge in the rotation direction of the rotor, in such a way that the cooling gas stream flowing through the gap is added to the cooling gas stream flowing into an adjoining ring gap segment essentially without a transition.

11. The turbo generator as claimed in claim 10, wherein the gas guidance segment is provided with an inwardly curved nose at the rear edge in the rotation direction of the rotor.

12. The turbo generator as claimed in claim 5, wherein the gas guidance segment is attached to the annular cap plate.

13. The turbo generator as claimed in claim 2, wherein at least one of the sections of the end spacer plates projects into the ring gap, has a greater thickness than a remaining part of the end spacer plate and projects with its side facing the cooling gas stream into a space on a side of the annular cap plate facing the rotor winding.

* * * * *